US009877201B2

(12) United States Patent
Moulsley et al.

(10) Patent No.: US 9,877,201 B2
(45) Date of Patent: *Jan. 23, 2018

(54) METHOD FOR COMMUNICATING IN A NETWORK, A SECONDARY STATION AND A SYSTEM THEREFOR

(71) Applicant: KONINKLIJKE PHILIPS N.V., Eindhoven (NL)

(72) Inventors: Timothy James Moulsley, Caterham (GB); Matthew P. J. Baker, Canterbury (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,740

(22) Filed: May 23, 2016

(65) Prior Publication Data
US 2016/0269909 A1    Sep. 15, 2016

Related U.S. Application Data

(63) Continuation of application No. 13/919,187, filed on Jun. 17, 2013, now Pat. No. 9,351,284, which is a
(Continued)

(30) Foreign Application Priority Data

Aug. 14, 2008    (EP) .................................... 08305480

(51) Int. Cl.
*H04W 4/00*        (2009.01)
*H04W 16/02*       (2009.01)
(Continued)

(52) U.S. Cl.
CPC ....... *H04W 16/02* (2013.01); *H04W 28/0278* (2013.01); *H04W 72/04* (2013.01);
(Continued)

(58) Field of Classification Search
CPC ............. H04W 16/02; H04W 72/0426; H04W 28/0278; H04W 72/1252; H04W 72/04; H04W 72/1284
See application file for complete search history.

(56) References Cited

U.S. PATENT DOCUMENTS 8,493,925 B2    7/2013    Moulsley et al.
2004/0223449 A1*   11/2004   Tsuie .................. H04L 27/2666
370/204
(Continued)

FOREIGN PATENT DOCUMENTS

CN    101064905 A    10/2007
CN    101132628 A    2/2008
(Continued)

OTHER PUBLICATIONS

"Effect of False Positive Semi-Persistent Grants", QULALCOMM Europe, 3GPP TSG-RAN WG2, #16 BIS, vol. R2-081827, Mar. 31-Apr. 4, 2008, Retrieved From the Internet: http://www.3gpp.org/ftp/tsg_ran/WG2_RL2/TSGR2_61bis/Docs/, on Mar. 31, 2008, 2 Pages Document.

*Primary Examiner* — Clemence Han (57) ABSTRACT

The present invention relates to a method for communicating in a network, comprising
a) a secondary station preparing the transmission to a primary station of a message comprising at least a data field for containing data in an allocated resource, said resource comprising a plurality of resource blocks, and
b) if the size of the allocated resource is bigger than required for the size of the message, the secondary station dividing the allocated resource in a first portion and a second portion, each portion comprising at least one resource block,
c) the secondary station transmitting the message to the primary station in the first portion of the resource,
(Continued)

d) the secondary station preventing from transmitting in the second portion of the resource.

54 Claims, 2 Drawing Sheets

Related U.S. Application Data continuation of application No. 13/058,631, filed as application No. PCT/IB2009/053475 on Aug. 7, 2009, now Pat. No. 8,493,925.

(51) Int. Cl.
*H04W 72/04* (2009.01)
*H04W 72/12* (2009.01)
*H04W 28/02* (2009.01)

(52) U.S. Cl.
CPC ... *H04W 72/0426* (2013.01); *H04W 72/1252* (2013.01); *H04W 72/1284* (2013.01)

(56) References Cited

U.S. PATENT DOCUMENTS

| | | |
|---|---|---|
| 2006/0039319 A1 | 2/2006 | Lee et al. |
| 2007/0155395 A1 | 7/2007 | Gopalakrishnan et al. |
| 2008/0198795 A1* | 8/2008 | Kim .................. H04W 76/048 370/328 |
| 2009/0257385 A1 | 10/2009 | Meylan et al. |
| 2010/0322172 A1* | 12/2010 | Hsu ..................... H04L 1/1867 370/329 |
| 2013/0094482 A1 | 4/2013 | Kim et al. |
| 2013/0114533 A1 | 5/2013 | Ji et al. |

FOREIGN PATENT DOCUMENTS

| | | |
|---|---|---|
| JP | 2008510422 A | 4/2008 |
| KR | 20080044168 A1 | 5/2008 |

\* cited by examiner

METHOD FOR COMMUNICATING IN A NETWORK, A SECONDARY STATION AND A SYSTEM THEREFOR

FIELD OF THE INVENTION

The present invention relates to a method for communicating in a network comprising a primary station and at least one secondary station, and to such a secondary station. More specifically, this invention relates to a method for communicating in a mobile telecommunication network, like a GSM (Global System for Mobile communications) or a UMTS (Universal Mobile Telecommunications System) network.

This invention is, for example, relevant for UMTS and UMTS Long Term Evolution, but as well to hubs which route calls from multiple terminals to base stations.

BACKGROUND OF THE INVENTION

In a mobile telecommunication network like a UMTS system, a primary station, for instance a Node B (or Base Station or eNB) communicates with at least one secondary station, for instance a User Equipment (or Mobile Station), by means of a plurality of channels. In order to transmit data to the primary station, a secondary station needs to request a resource to the primary station, which is then allocated. This request of allocation can be made in several ways depending on the considered channel.

In an example, in order to request a resource, it is required to indicate the amount of data to be transmitted, i.e. the data in the buffer of the secondary station. To this end, the secondary station transmits to the primary station a buffer status report indicative of the amount of data in the secondary station buffer. Thus, the primary station allocates a resource corresponding to both the capability of the network and the amount of data to be transmitted. This permits the allocation of resource to be adjusted.

However, if a message relating to an uplink resource grant is received in error, i.e. the secondary station had no use of this resource because no data is to be transmitted, or when no uplink resource grant was transmitted, this can lead to several problems. For false uplink grant, the secondary station transmits a data packet using the whole granted resource. Even if the secondary station has no data it will transmit a buffer status report using the whole of the resource indicated in the grant, for instance by completing the resource with padding bits.

Moreover, some systems use semi persistent scheduling, according to which some parameters may be configured by higher layers, and resources are granted on a periodic basis in order to match the needs of specific applications (for example uplink transmission resources every 20 ms to support VoIP). In case of false semi persistent scheduling (SPS) activation, the secondary station will periodically transmit data packets using the whole granted resource. If the secondary station has no data to transmit, it transmits a BSR, but releases the resource after a configurable number of transmissions if there is still no data to send. In both cases significant uplink interference is generated, even if the secondary station has no data to send.

SUMMARY OF THE INVENTION

It is an object of the invention to propose a method enabling this problem to be alleviated.

It is still another object of the invention to propose a method improving the management of resources.

It is still another object of the invention to propose a method permitting to reduce the interference on the uplink channel.

To this end, a method of communicating in a network is proposed, said method comprising
 a) a secondary station preparing the transmission to a primary station of a message comprising at least a data field for containing data in an allocated resource, said resource comprising a plurality of resource blocks, and
 b) if the size of the allocated resource is bigger than required for the size of the message, the secondary station dividing the allocated resource in a first portion and a second portion, each portion comprising at least one resource block,
 c) the secondary station transmitting the message to the primary station in the first portion of the resource,
 d) the secondary station preventing transmission in the second portion of the resource.

In accordance with a second aspect of the invention, a secondary station is proposed, said secondary station comprising a controller for preparing the transmission to a primary station of a message comprising at least a data field for containing data in an allocated resource, said resource comprising a plurality of resource blocks, wherein the controller being arranged to dividing the allocated resource in a first portion and a second portion, each portion comprising at least one resource block, if the size of the allocated resource is bigger than required for the size of the message, and means for transmitting the message to the primary station in the first portion of the resource, wherein the controller is arranged to prevent the transmitted from transmitting in the second portion of the resource.

In accordance with a third aspect of the invention, a system of communication is proposed, said system comprising a primary station and at least one secondary station a controller for preparing the transmission to the primary station of a message comprising at least a data field for containing data in an allocated resource, said resource comprising a plurality of resource blocks, wherein the controller being arranged to dividing the allocated resource in a first portion and a second portion, each portion comprising at least one resource block, if the size of the allocated resource is bigger than required for the size of the message, and means for transmitting the message to the primary station in the first portion of the resource, wherein the controller is arranged to prevent the transmitted from transmitting in the second portion of the resource.

In accordance with a fourth aspect of the invention, a primary station is proposed, said primary station comprising means for communicating with a secondary station, said means comprising a receiver for receiving a message from the secondary station, a decoder for decoding the message with a message size corresponding to the allocated resource and a controller for selecting one message size from a set of message sizes if decoding fails, wherein the decoder is arranged to decode the message with this selected message size.

As a consequence, interference, especially in case of resources granted in error or falsely received, is reduced, since the secondary station does not transmit during a portion of the allocated resource. This is even more efficient for semi persistent schedule (SPS) activation, where the allocated resource can be allocated for several subframes or frames.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
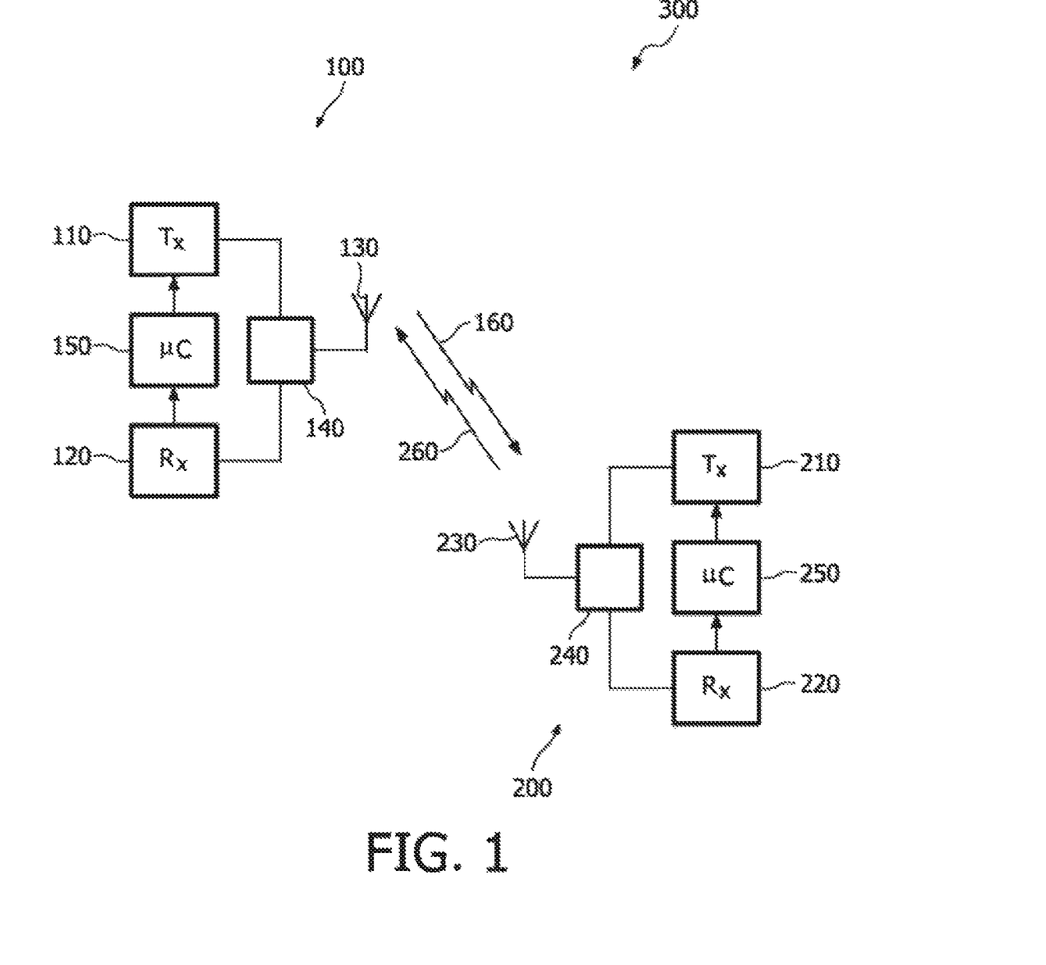
FIG. 1 is a block diagram of a system in which is implemented the invention.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

As explained before, in LTE, if a message relating to an uplink grant is received in error, or the UE decodes one when none was transmitted, then the following problems can occur.

For false uplink grant, the secondary station transmits a data packet using the whole granted resource. Even if the UE has no data it will transmit a BSR using the whole of the resource indicated in the grant.

For false SPS activation, the UE will periodically transmit data packets using the whole granted resource. If the UE has no data it will transmit a BSR, but release the resource after a configurable number of transmissions if there is still no data to send.

The main consequence is that, in both cases, significant uplink interference is generated, even if the UE has no data to send.

One possible solution would be for the UE to transmit nothing in the case that it receives a grant but has no data. However, this would not allow the eNodeB to receive any other small messages, such as a BSR (Buffer Status Report) that would be transmitted if there was data to be sent at the same time.

The embodiments of this invention are based on the recognition that the UE does not need to transmit using the whole granted resource in the case that it has no data, but there is some other small message to send. It must be noted that this may have a drawback, which is the requirement of more processing on the primary station side.

In the case that a secondary station should transmit some small message, such as Buffer Status Report, even when it has no data, then it is proposed that the secondary station transmits with a limited resource (and a reduced transport block size). To ensure that the primary station is aware of the resulting message size and resources used, these should ideally be derived from the granted resource. For instance, if the granted resource is n resource blocks, the size of the utilized resource could be 0.25 n blocks.

In the case that the secondary station really is granted a resource, but has no data, then it can still send a Buffer Status Report or other message. In the case of a false detection of an uplink grant, the resulting uplink interference will typically be much lower than if the UE used the full granted resource. This permits then to increase the Quality of Service of the whole system The main disadvantage of this invention is that the primary station may have additional processing. For example, if reception of an uplink packet fails, the primary station may need to also attempt decoding under the assumption that a BSR is sent with no data in the smaller resource. This would require additional soft buffers to be maintained. Fortunately the extra processing load will be small, since the transport block size for BSR will not be large. As a consequence, the further processing load can be coped with.

In an embodiment based on LTE, if a secondary station receives a grant for uplink transmission, but has not data to send, the specification requires it to send a buffer status report. The BSR is sent in a resource derived from the grant message. As an example this could be defined to be the single lowest frequency resource block within the set of resource blocks in the granted resource. The transport block size is fixed to be the smallest size which can contain the BSR (and any associated overheads).

The application of the invention is not restricted to LTE. The resources could be frequency domain resource blocks, time slots or codes.

The invention could also be applied to other messages, such as a report on radio channel status. The main requirement is that the message size is known. Then the eNodeB will be able to perform an additional decoding assuming the message size (and resource allocation). Support of a small set of allowed message sizes would be possible. The invention could also be applied in the case that the resource is much too large for the data packet, in which case a smaller resource could be used instead (e.g. half the granted resource). In general, this approach would lead to a small number of additional resource sizes (and transport block sizes) which would be allowed in response to each UL grant. The eNodeB might thus be required to perform more than one decoding attempt for each packet, under different assumptions about its size.

In a variant of the invention, this invention could be used in combination with one of the following embodiments.

From time to time, the secondary station 200 transmits on the uplink channel 260 an indication of the status of its buffer containing data to be transmitted. This Buffer Status Report can be of different types. A short Buffer Status Report (BSR) comprises the identity of a single group of logical channels, together with a 6-bit indicator of the amount of data corresponding to that group of logical channels currently residing in the secondary station's buffer awaiting transmission. A long BSR comprises 4 concatenated short BSRs, each corresponding to a different group of logical channels.

Many communication systems operate using a centralised scheduler which is responsible for allocating transmission resources to different nodes. A typical example is the uplink of the UMTS LTE, where the uplink transmissions from different UEs are scheduled in time and frequency by the eNB; the eNB transmits a "scheduling grant" message to a UE, indicating a particular time-frequency resource for the UE's transmission typically around 3 ms after the transmission of the grant message. The grant message also typically specifies the data rate and/or power to be used for the UE's transmission. In order for the eNB to issue appropriate grants, it needs to have sufficient information about the amount, type of data and the urgency of it awaiting transmission in the buffer of each UE. This information can be used to inform the scheduler in the eNB of either the satisfaction level of individual UEs or UEs whose service might be close to being dropped.

In LTE, a number of different types of buffer status report (BSR) messages are therefore defined, which may be transmitted from a UE to the eNB when certain triggers occur. The state of the art in this respect is defined by the current version of 3GPP TS36.321 (as of June 2008), §5.4.5 incorporated for reference.

A short BSR comprises the identity of a single group of logical channels, together with a 6-bit indicator of the amount of data corresponding to that group of logical channels currently residing in the UE's buffer awaiting transmission. A long BSR comprises 4 concatenated short BSRs, each corresponding to a different group of logical channels.

This is currently defined in 36.321 (as of June 2008) §6.1.3.1 incorporated by reference.

As detailed in this paragraph, there are two main types of Buffer Status Reports (BSR) with different characteristics:
Regular BSR which is triggered only if UL data arrives in the UE transmission buffer and the data belongs to a logical channel with higher priority than those for which data already existed in the UE transmission buffer.
Periodic BSR, which is triggered when the PERIODIC BSR TIMER expires.
If the UE has no UL resources allocated for new transmission for this TTI and if a Regular BSR has been triggered since the last transmission of a BSR a Scheduling Request (SR) shall be triggered.

The BSR mechanism has been designed so that only regular BSRs can trigger the sending of an SR if there is no UL resources available for the sending of the a regular BSR. When a periodic BSR is triggered and there is no UL resource allocated then the UE cannot send SR, as it is assumed that the network knows that the UE has data available and is deliberately not allocating any UL resources for the UE to use.

If the periodic BSR were allowed to send SR in the case of no UL resource available for the sending of the BSR then the system may become overloaded with UEs sending SR. Particularly if the UE has no PUCCH resources available, when an SR would require the sending of a RACH access.

Also, it is stated in 36.321 that an SR is considered pending and is repeated until UL-SCH resources are granted.

A problem with the BSR procedure defined above is that there is a possibility that the information that the network knows about the state of the buffers in the UE can be different from the actual state of the UE buffers. This can occur when BSRs are received in the eNB out of order.

If a network receives BSRs from a UE at different times there is no way for the eNB to determine which was the last BSR sent by the UE as an earlier BSR may just be being received late, for example due to HARQ retransmissions. This can lead to the problem that a BSR with zero may be received by the UE and then the network removes UL resource from the UE, even though the UE now has data to be sent in its buffer. The UE cannot send SR as the trigger for a regular BSR (new data with higher priority) is not met even if a periodic BSR is configured An example of this is shown on FIG. 2. On this time chart, it can be seen that the buffer status report 1000, which is sent before the buffer status report 1001, is received only after, because of the number of retransmissions. This report 1000 may be a periodic report, which can indicate that no data is in the buffer status report. If the primary station receives the reports in the indicated order, it will wrongly believe that the current status is that no data is in the buffer of the secondary station. Because of that, it will remove the UL resource from UE, that should have been granted.

Figure 2:
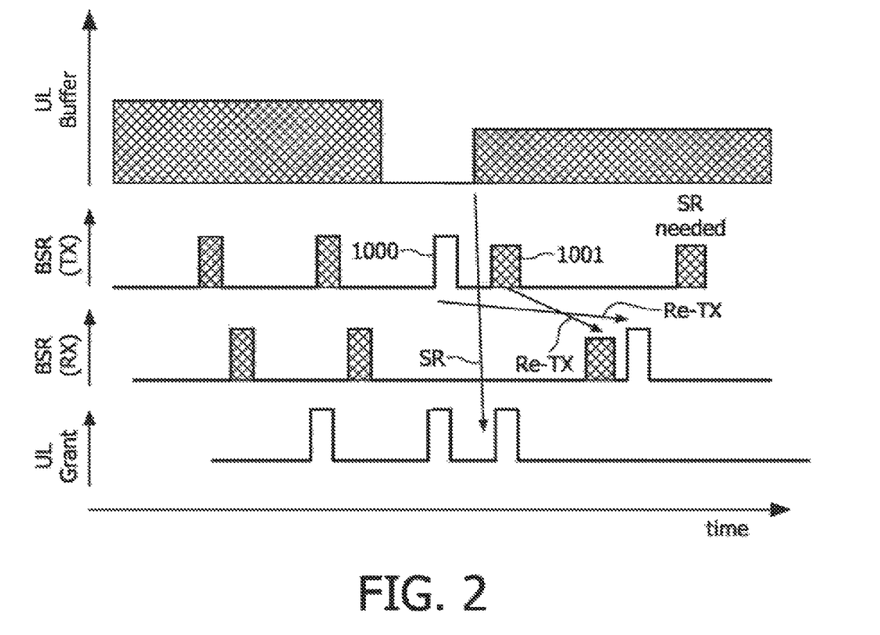
FIG. 2 is a time chart illustrating the exchange of messages in accordance with a conventional technique.

If the report 1000 is a normal report indicating that there is data to be transmitted, and report 1001 a periodic report indicating that there is no more data to be transmitted, the primary station may, because of this confusion allocate a resource although it was not required. This leads to a waste of resources. However, this situation is less likely to happen.

The main problem here is that an SR should not be generated from a periodic BSR, because if an SR were generated from a periodic BSR then the UE would be constantly asking for UL resources when there may be none available.

Moreover, in the case described above the network view of the buffer status is out of synchronisation with the actual UE UL data buffer status. One aspect of the present invention provides a method for transmission of BSRs with modified channel coding in order to make their transmission more robust and reduce the risk of this problem occurring, as will be explained hereafter.

In LTE, when the secondary station has an uplink grant which is too large for the amount of data (which is the case for instance is no data is in the buffer), it will transmit anyway and add padding, including a padding BSR if possible. Padding is applied in order to reach the granted transport block size. This will occur even if there is no data to be transmitted. This situation can lead to wasted uplink resources from sending the padding bits.

Reliable reception of the BSR is important, in order to allow efficient scheduling. Therefore methods for improving BSR robustness are of interest.

In principle it would be possible to make use of the padding bits in the decoding process (provided their values are known). However, this would require changes to receiver decoding algorithms, and would not be the most efficient way of using these bits.

These embodiments which could be combined with the preceding embodiments of the invention are based on the recognition that when a secondary station is granted more resource than is required for uplink data transmission plus other signalling such as BSR, it may use the additional resource to transmit additional redundancy, rather than padding bits. This can increase the probability of correct decoding of the BSR message.

The main disadvantage of e embodiments where the UE may transmit messages with more than one format for a given granted resource is that the primary station or eNodeB may need to carry out additional processing. For example, if reception of an uplink packet fails, the eNodeB may need to also attempt decoding under the assumption that only a padding BSR (or other message of known size) has been sent instead. This would require additional soft buffers to be maintained. Fortunately the extra processing load will typically be small, since the transport block size for BSR will not be large.

In one variant based on LTE, when a secondary station receives an UL grant (indicating a resource and a transport block size) but has no data to send, it transmits a padding BSR. According to the invention the transport block size is reduced to a value which is just sufficient to send the BSR message. Then channel coding is applied in the usual way, and this will add redundancy up to the transport block size. The eNodeB can attempt to decode the resulting message first under the assumption of a normal transmission, then if that fails, under the assumption that BSR was sent with a smaller transport block (but with one of a limited set of sizes).

In another variant based on LTE, when a secondary station receives an uplink grant (indicating a resource and a transport block size) but has less data to send than indicated in the grant, then according to the invention it assumes a reduced transport block size (which may be chosen from a limited set), and transmits a padding BSR and data. The channel coding is applied in the usual way for that selected transport block size. As a consequence, the channel coding may typically be of a lower rate than the coding corresponding to the block of a normal size, and therefore the transmission will be more robust to errors. The eNodeB can attempt to decode the resulting message first under the assumption of a normal transmission, then if that fails, under the assumption that BSR was sent with a smaller transport block size (but with one of a limited set of sizes) and its corresponding coding. In a variant of this embodiment, only one coding is associated to each size of transport block.

In still another variant of this embodiment based on LTE, when a UE receives an UL grant (indicating a resource and a transport block size) but has less data to send than indicated in the grant, the transport block size is not changed, but the message is repeated inside the transport block to increase its size to be equal to the granted transport block size. Channel coding is applied in the usual way. This means that the padding bits are effectively replaced by data repetition. This has the disadvantage of requiring a change to the receiver decoding architecture, in order to exploit the data repetition efficiently.

This invention and its various embodiments may be implemented in mobile communication systems where communication devices utilize centralized scheduling, such as UMTS and LTE.

Moreover, this invention could as well be implemented for hubs which route connections from multiple terminals to base stations. Such devices would appear like a secondary station from the point of view of the network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method of operating a secondary station for communicating in a network, the method comprising the acts:
   a secondary station preparing a transmission to a primary station of a message comprising at least a data field for containing data in an allocated resource, the resource comprising a plurality of resource blocks, and
   if the size of the allocated resource is bigger than required for the size of the message, the secondary station dividing the allocated resource in a first portion and a second portion, each portion comprising at least one resource block,
   the secondary station transmitting the message to the primary station in the first portion of the resource,
   the secondary station preventing transmission in the second portion of the resource.

2. The method of claim 1, wherein the message comprising a report to be transmitted along with the data field.

3. The method of claim 2, wherein the report is indicative of the amount of data in a buffer of the secondary station.

4. The method of any of claim 2, wherein step b) is carried out if no data is to be transmitted in the data field.

5. The method of claim 1, wherein the size of the first portion is derived from the size of the allocated resource.

6. The method of claim 5, wherein the size of the first portion is a ratio from the allocated resource, the ratio being selected from a set of predetermined ratios.

7. The method of claim 1, wherein the at least one resource block of the first portion is deduced from the allocated resource in a predetermined manner.

8. The method of claim 7, wherein the at least one resource of the first portion is the lowest frequency resource block of the allocated resource.

9. The method of any of claim 1, wherein a channel coding applied to the message is determined according to the size of the message and the size of the first portion of the resource.

10. The method of claim 1, further operating a primary station, the method comprising the acts:
    the primary station receiving the message,
    decoding the message with a message size corresponding to the allocated resource, and
    if decoding fails, selecting one message size from a set of message sizes and decoding the message with this selected message size.

11. A secondary station comprising a controller for preparing a transmission to a primary station of a message comprising at least a data field for containing data in an allocated resource, the resource comprising a plurality of resource blocks, wherein the controller being arranged to dividing the allocated resource in a first portion and a second portion, each portion comprising at least one resource block, if the size of the allocated resource is bigger than required for the size of the message, and a transmitter configures to transmit the message to the primary station in the first portion of the resource, wherein the controller is arranged to prevent transmission in the second portion of the resource.

12. A system comprising a primary station and at least one secondary station a controller for preparing a transmission to the primary station of a message comprising at least a data field for containing data in an allocated resource, the resource comprising a plurality of resource blocks, wherein the controller being arranged to dividing the allocated resource in a first portion and a second portion, each portion comprising at least one resource block, if the size of the allocated resource is bigger than required for the size of the message, and a transmitter configured to transmit the message to the primary station in the first portion of the resource, wherein the controller is arranged to prevent the transmission in the second portion of the resource.

13. A primary station for communicating with a secondary station, the comprising: a receiver for receiving a message from the secondary station, a decoder for decoding the message with a message size corresponding to an allocated resource and a controller for selecting one message size from a set of message sizes if decoding fails, wherein the decoder is arranged to decode the message with this selected message size.

14. A method for operating a secondary station for communicating in a network, with a primary station, the method comprising:
at the secondary station:
preparing a message, by a controller, for transmission to a primary station, the message comprising at least a data field for storing data to be transmitted within an allocated resource,
dividing, by the controller, the allocated resource into a first portion and a second portion, in the case where the size of the allocated resource is larger than required for the size of the data field,
transmitting, by a transmitter controlled by the controller, the message, using the first portion of the allocated resource, to the primary station, and
preventing, by the controller, transmission using the second portion of the allocated resource.

15. The method according to claim 14, wherein the message comprises a report to be transmitted along with the data field.

16. The method according to claim 15, wherein the report is indicative of the amount of data in a buffer of the secondary station.

17. The method according to claim 14, wherein the dividing step is performed irrespective of whether or not data is to be transmitted in the data field.

18. The method according to claim 14, wherein the size of the first portion is derived from the size of the allocated resource.

19. The method according to claim 18, wherein the at least one resource of the first portion is the lowest frequency resource block of the allocated resource.

20. The method according to claim 14, wherein a ratio between the size of the first portion and the size of the allocated resource is selected from a set of predetermined ratios.

21. The method according to claim 14, wherein the at least one resource block of the first portion is deduced from the allocated resource in a predetermined manner.

22. The method according to claim 14, wherein a channel coding applied to the message is determined according to the size of the message and the size of the first portion of the resource.

23. A method for operating a secondary station for communicating in a network, with a primary station, the method comprising:
at the secondary station:
preparing a message, by a controller, for transmission to a primary station, the message comprising at least a data field and one or more further information fields for storing data and further information to be transmitted using an allocated resource,
dividing, by the controller, the allocated resource into a first portion and a second portion, in the case where the size of the allocated resource is larger than required for the total size of the data field together with the one or more further information fields,
transmitting, by a transmitter controlled by the controller, the message, using the first portion of the allocated resource, to the primary station, and
preventing, by the controller, transmission using the second portion of the allocated resource.

24. The method according to claim 23, wherein the message comprises a report to be transmitted along with the data field.

25. The method according to claim 24, wherein the report is indicative of the amount of data in a buffer of the secondary station.

26. The method according to claim 23, wherein the dividing step is performed irrespective of whether or not data is to be transmitted in the data field.

27. The method according to claim 23, wherein the size of the first portion is derived from the size of the allocated resource.

28. The method according to claim 27, wherein the at least one resource of the first portion is the lowest frequency resource block of the allocated resource.

29. The method according to claim 23, wherein a ratio between the size of the first portion and the size of the allocated resource is selected from a set of predetermined ratios.

30. The method according to claim 23, wherein the at least one resource block of the first portion is deduced from the allocated resource in a predetermined manner.

31. The method according to claim 23, wherein a channel coding applied to the message is determined according to the size of the message and the size of the first portion of the resource.

32. A secondary station comprising:
a controller arranged to:
prepare a message for transmission to a primary station, the message comprising at least a data field storing data using an allocated resource, wherein the allocated resource comprises a plurality of resource blocks,
divide the allocated resource into a first portion and a second portion, in the case where the size of the allocated resource is larger than required for the size of the data field,
a transmitter controlled by the controller and arranged to:
transmit the message, using the first portion of the allocated resource, to the primary station, and
the controller further arranged to:
prevent transmission by the transmitter using the second portion of the allocated resource.

33. The secondary station according to claim 32, wherein the message comprises a report to be transmitted along with the data field.

34. The secondary station according to claim 33, wherein the report is indicative of the amount of data in a buffer of the secondary station.

35. The secondary station according to claim 33, wherein the controller divides the allocated resource if no data is to be transmitted in the data field.

36. The secondary station according to claim 33, wherein the size of the first portion is derived from the size of the allocated resource.

37. The secondary station according to claim 36, wherein the at least one resource of the first portion is the lowest frequency resource block of the allocated resource.

38. The secondary station according to claim 33, wherein the size of the first portion is a ratio from the allocated resource, the ratio being selected from a set of predetermined ratios.

39. The secondary station according to claim 33, wherein the at least one resource block of the first portion is deduced from the allocated resource in a predetermined manner.

40. The secondary station according to claim 33, wherein a channel coding applied to the message is determined according to the size of the message and the size of the first portion of the resource.

41. A secondary station comprising:
a controller arranged to:
prepare a message for transmission to a primary station, the message comprising at least a data field and one or more further information fields for storing data and further information using an allocated resource, wherein the allocated resource comprises a plurality of resource blocks,
divide the allocated resource into a first portion and a second portion, in the case where the size of the allocated resource is larger than required for the total size of the data field together with the one or more further information fields,
a transmitter controlled by the controller and arranged to:
transmit the message, using the first portion of the allocated resource, to the primary station, and
wherein the controller is further arranged to:
prevent transmission by the transmitter using the second portion of the allocated resource.

42. The secondary station according to claim 41, wherein the message comprises a report to be transmitted along with the data field.

43. The secondary station according to claim 42, wherein the report is indicative of the amount of data in a buffer of the secondary station.

44. The secondary station according to claim 41, wherein the controller divides the allocated resource if no data is to be transmitted in the data field.

45. The secondary station according to claim 44, wherein the at least one resource of the first portion is the lowest frequency resource block of the allocated resource.

46. The secondary station according to claim 41, wherein the size of the first portion is derived from the size of the allocated resource.

47. The secondary station according to claim 41, wherein the size of the first portion is a ratio from the allocated resource, the ratio being selected from a set of predetermined ratios.

48. The secondary station according to claim 41, wherein the at least one resource block of the first portion is deduced from the allocated resource in a predetermined manner.

49. The secondary station according to claim 41, wherein a channel coding applied to the message is determined according to the size of the message and the size of the first portion of the resource.

50. A computer readable storage medium, that is not a transitory propagating signal or wave, having stored thereon instructions that when executed cause processing circuitry of a secondary station to:
prepare a message, for transmission to a primary station, the message comprising at least a data field for storing data to be transmitted using an allocated resource,
divide the allocated resource into a first portion and a second portion, in the case where the size of the allocated resource is larger than required for the size of the data field,
transmit the message, using the first portion of the allocated resource, to the primary station, and
prevent transmission using the second portion of the allocated resource.

51. A computer readable storage medium, that is not a transitory propagating signal or wave, having stored thereon instructions that when executed cause processing circuitry of a secondary station to:
prepare a message for transmission to a primary station, the message comprising at least a data field and one or more further information fields for storing data and further information to be transmitted using an allocated resource,
divide the allocated resource into a first portion and a second portion, in the case where the size of the allocated resource is larger than required for the total size of the data field together with the one or more further information fields,
transmit the message, using the first portion of the allocated resource, to the primary station, and
prevent transmission using the second portion of the allocated resource.

52. A primary station comprising:
a receiver configured to receive a message from a secondary station,
a decoder configured to decode the message with the message size corresponding to an allocated resource,
a controller arranged to select one message size from a set of message sizes in the case where the decoding of the message fails, wherein the decoder is arranged to decode the message with the selected message size.

53. A system comprising a primary station and at least one secondary station:
the secondary station comprising:
a controller arranged to:
prepare a message for transmission to a primary station, the message comprising at least a data field for storing data and further information using an allocated resource, wherein the allocated resource comprises a plurality of resource blocks,
divide the allocated resource into a first portion and a second portion, in the case where the size of the allocated resource is larger than required for the size of the data field,
a transmitter controlled by the controller and arranged to:
transmit the message, using the first portion of the allocated resource, to the primary station, and
wherein the controller is further arranged to:
prevent transmission by the transmitter using the second portion of the allocated resource, and
the primary station comprising:
a receiver configured to receive a message from a secondary station,
a decoder configured to decode the message with the message size corresponding to an allocated resource,
a controller arranged to select one message size from a set of message sizes in the case where the decoding of the message fails, wherein the decoder is arranged to decode the message with the selected message size.

54. A system comprising a primary station and at least one secondary station:
the secondary station comprising:
a controller arranged to:
prepare a message for transmission to a primary station, the message comprising at least a data field and one or more further information fields for storing data and further information using an allocated resource, wherein the allocated resource comprises a plurality of resource blocks,
divide the allocated resource into a first portion and a second portion, in the case where the size of the allocated resource is larger than required for the total size of the data field together with the one or more further information fields,
a transmitter controlled by the controller and arranged to:
transmit the message, using the first portion of the allocated resource, to the primary station, and
wherein the controller is further arranged to:
prevent transmission by the transmitter using the second portion of the allocated resource, and
the primary station comprising:
a receiver configured to receive a message from a secondary station,
a decoder configured to decode the message with the message size corresponding to an allocated resource,
a controller arranged to select one message size from a set of message sizes in the case where the decoding of the message fails, wherein the decoder is arranged to decode the message with the selected message size.

* * * * *